US009260547B2

(12) United States Patent
Senol et al.

(10) Patent No.: US 9,260,547 B2
(45) Date of Patent: Feb. 16, 2016

(54) METHOD OF POLYMERIZING OLEFINS IN SLURRY REACTORS

(71) Applicant: BOREALIS AG, Vienna (AT)

(72) Inventors: Ilke Senol, Espoo (FI); Erik Eriksson, Stenungsund (SE); Kauno Alastalo, Porvoo (FI); Pauli Leskinen, Helsinki (FI); Klaus Nyfors, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/723,016

(22) Filed: May 27, 2015

(65) Prior Publication Data

US 2015/0259446 A1    Sep. 17, 2015

Related U.S. Application Data

(63) Continuation of application No. PCT/EP2013/074920, filed on Nov. 28, 2013.

(30) Foreign Application Priority Data

Dec. 7, 2012   (EP) .................................... 12195987

(51) Int. Cl.
   *C08F 2/14*    (2006.01)
   *C08F 2/38*    (2006.01)
   *C08F 110/02*  (2006.01)

(52) U.S. Cl.
   CPC ................. *C08F 110/02* (2013.01); *C08F 2/14* (2013.01)

(58) Field of Classification Search
   CPC .............. C08F 2/00; C08F 2/14; C08F 2/001; C08F 2/38; C08F 10/02
   USPC ......................................... 526/64, 65; 525/53
   See application file for complete search history.

(56) References Cited

U.S. PATENT DOCUMENTS

| 3,242,150 | A | 3/1966 | Scoggin |
| 3,324,093 | A | 6/1967 | Alleman |
| 3,374,211 | A | 3/1968 | Marwil et al. |
| 3,405,109 | A | 10/1968 | Rohlfing |
| 4,582,816 | A | 4/1986 | Miro |
| 5,391,654 | A | 2/1995 | Ahvenainen et al. |
| 7,816,465 | B2 * | 10/2010 | Andtsjo ................. C08F 10/02 422/132 |
| 2001/0018499 | A1 | 8/2001 | Marissal et al. |

FOREIGN PATENT DOCUMENTS

| EP | 0 479 186 A2 | 4/1992 |
| EP | 0 517 183 A2 | 12/1992 |
| EP | 0 688 794 A1 | 12/1995 |
| EP | 0 810 235 A2 | 12/1997 |
| EP | 0 891 990 A2 | 1/1999 |
| EP | 1 310 295 A1 | 5/2003 |
| EP | 1 415 999 A1 | 5/2004 |
| EP | 1 563 903 A1 | 8/2005 |
| EP | 1 591 460 A1 | 11/2005 |
| EP | 1 739 103 A1 | 1/2007 |
| EP | 1 752 462 A1 | 2/2007 |
| EP | 1 860 125 A1 | 11/2007 |
| EP | 1 992 648 A1 | 11/2008 |
| EP | 2 186 833 A1 | 5/2010 |
| GB | 1 532 332 A1 | 11/1978 |
| WO | WO 92/12182 A1 | 7/1992 |
| WO | WO 95/12622 A1 | 5/1995 |
| WO | WO 96/18662 A1 | 6/1996 |
| WO | WO 96/32423 A1 | 10/1996 |
| WO | WO 97/28170 A1 | 8/1997 |
| WO | WO 98/32776 A1 | 7/1998 |
| WO | WO 99/51646 A1 | 10/1999 |
| WO | WO 99/61489 A1 | 12/1999 |
| WO | WO 01/55230 A1 | 8/2001 |
| WO | WO 02/28922 A1 * | 4/2002 |
| WO | WO 03/010208 A1 | 2/2003 |
| WO | WO 03/051514 A1 | 6/2003 |
| WO | WO 03/051934 A2 | 6/2003 |
| WO | WO 03/106510 A1 | 12/2003 |
| WO | WO 2004/085499 A2 | 10/2004 |
| WO | WO 2005/118655 A1 | 12/2005 |
| WO | WO 2007/025640 A1 | 3/2007 |
| WO | WO 2007/134837 A1 | 11/2007 |

OTHER PUBLICATIONS

PCT International Search Report mailed Jan. 29, 2014, which was issued in a related PCT International Application No. PCT/EP2013/074920 (3 pages).

European Search Report completed Mar. 27, 2013, which was issued in a related EP Application No. 12195987.8 (4 pages).

* cited by examiner

*Primary Examiner* — Fred M Teskin

(74) *Attorney, Agent, or Firm* — Robert P. Michal, Esq.; Carter, DeLuca, Farrell & Schmidt, LLP

(57) ABSTRACT

A process including polymerizing ethylene in the presence of a polymerization catalyst and hydrogen in a first polymerization reactor to produce a first slurry; withdrawing a first stream of the slurry from the first polymerization reactor; directing the slurry stream into a second polymerization reactor; polymerizing ethylene in the presence of the first ethylene polymer, the polymerization catalyst, and hydrogen in a second polymerization reactor to produce a second slurry; withdrawing from the second polymerization reactor a second slurry stream having a solids concentration higher than the average solids concentration of the second slurry within the second polymerization reactor; withdrawing from the second polymerization reactor a third slurry stream having a solids concentration lower than the average solids concentration of the second slurry within the second polymerization reactor; and directing at least a part of the second slurry stream into one of the first and second polymerization reactors.

14 Claims, No Drawings

METHOD OF POLYMERIZING OLEFINS IN SLURRY REACTORS

CROSS REFERENCES TO RELATED APPLICATIONS

This application is a Continuation of PCT International Patent Application No. PCT/EP2013/74920 filed on Nov. 28, 2013, which claims the benefit of European Patent Application No. 12195987.8 filed Dec. 7, 2012, the entire disclosure of each of which is incorporated herein by reference in its entirety.

FIELD OF THE INVENTION

The present invention is directed to the polymerization of olefins. More specifically, the present invention is directed to the polymerization of ethylene in at least two cascaded reactors. In particular, the process is directed to the start-up of the polymerization of ethylene in two cascaded slurry polymerization reactors.

PROBLEM TO BE SOLVED

It is known to produce bimodal ethylene polymers in two or more cascaded reactors, for instance from WO-A-1992012182 and EP-A-2186833. However, it has been found that when starting up such reactor system it takes a long time before the reactors operate in steady-state conditions. Especially, it may take a significant time until the solids concentration in the reactors has reached the desired level. Another problem often encountered in the industry is the long duration of transitions when switching the production from one grade to another.

One further problem sometimes encountered when polymerizing olefins in the presence of cascaded polymerization reactors is that it is difficult to obtain a sufficient residence time of the polymer within one of the reactors to reach a desired production rate. It may be, for instance, that the reactor is operated in such conditions that the activity of the catalyst is low and therefore solids concentration in the reactor cannot be maintained at a sufficient level.

The aim of the present invention is to overcome the problems discussed above and provide a process where the time for producing out-of-specification polymer is reduced compared to prior art processes and which is flexible in its operation range allowing the production multimodal ethylene polymers over a broad range of properties.

PRIOR ART

EP-A-1992648 discloses a process where ethylene is polymerized in two cascades slurry reactors. The slurry withdrawn from the first reactor is concentrated in a concentration device. A part of the concentrated slurry is returned to the withdrawal line upstream of the concentration device.

WO-A-2007134837 discloses a process where propylene is polymerized in a slurry reactor. The slurry is withdrawn from the reactor and divided into a polymer-rich fraction and a polymer-lean fraction. The polymer-lean fraction is further divided into first and second streams. The first stream is returned to the polymerization reactor without further purification whereas the second stream is subjected to purification steps prior to returning it into the polymerization reactor.

EP-A-1563903 discloses a process where a bypass line is arranged within a loop reactor to provide an alternative flow path for the slurry within the loop reactor.

SUMMARY OF THE INVENTION

One aspect of the present invention is to provide a process for producing ethylene polymers in at least two cascaded polymerization reactors comprising the steps of:
  polymerizing ethylene in the presence of a polymerization catalyst, hydrogen and optionally one or more alpha-olefin comonomers in a diluent in a first polymerization reactor to produce a first slurry comprising a first ethylene polymer and fluid phase comprising said diluent;
  withdrawing a first stream of said slurry from said first polymerization reactor;
  directing said slurry stream into a second polymerization reactor;
  polymerizing ethylene in the presence of the first ethylene polymer, the polymerization catalyst, hydrogen and optionally one or more alpha-olefin comonomers in a diluent in a second polymerization reactor to produce a second slurry comprising an ethylene polymer mixture and a fluid phase comprising said diluent;
  withdrawing from said second polymerization reactor a second slurry stream having a solids concentration which is higher than the average solids concentration of the second slurry within the second polymerization reactor;
  withdrawing from said second polymerization reactor a third slurry stream having a solids concentration which is lower than the average solids concentration of the second slurry within the second polymerization reactor; and
  directing at least a part of said second slurry stream into said first polymerization reactor.

DETAILED DESCRIPTION

General Description

The present invention is directed to starting up a process where ethylene is polymerized in the presence of a polymerization catalyst and optionally comonomers and hydrogen, in at least two cascaded polymerization stages in at least two cascaded polymerization reactors. The stages are conducted in slurry in the presence of a diluent and hydrogen to produce an ethylene polymer. Two slurry streams are withdrawn from the second polymerization stage conducted in the second polymerization reactor so that one of them, the second slurry stream, has a higher solids concentration and the other, the third slurry stream, has a lower solids concentration than the average solids concentration in the second polymerization reactor. During the start-up period the second slurry stream, or at least a part of it, is returned into the first polymerization stage conducted in the first polymerization reactor. The third slurry stream is preferably withdrawn from the process and may be directed to recovery section to be recovered and reused in the polymerization stages.

Catalyst

The polymerisation is conducted in the presence of an olefin polymerisation catalyst. The catalyst may be any catalyst which is capable of producing the desired ethylene polymer. Suitable catalysts are, among others, Ziegler-Natta catalysts based on a transition metal, such as titanium, zirconium and/or vanadium or metallocene catalysts or late transition metal catalysts. Especially Ziegler-Natta catalysts and metallocene catalysts are useful as they can produce polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 μm. However, it has turned out that special advantages can be obtained if the support has an average particle size from 15 to 30 μm, preferably from 18 to 25 μm. Alternatively, the support may have an average particle size of from 30 to 80 μm, preferably from 30 to 50 μm. Examples of suitable support materials are, for instance, ES747JR produced and marketed by Ineos Silicas (former Crossfield), and SP9-491, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646.

Alternatively, it can be prepared by first preparing a solution from the components and then contacting the solution with a carrier, as described in WO-A-01/55230.

Another, especially preferred group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further preferred type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used in the process of the present invention. Metallocene catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Metallocene catalyst is used together with an activator. Suitable activators are metal alkyl compounds and especially aluminium alkyl compounds known in the art. Especially suitable activators used with metallocene catalysts are alkylaluminium oxy-compounds, such as methylalumoxane (MAO), tetraisobutylalumoxane (TIBAO) or hexaisobutylalumoxane (HIBAO).

Slurry Polymerization Process

The polymerization in the first and second polymerization stages is conducted in slurry. Then the polymer particles formed in the polymerization, together with the catalyst fragmented and dispersed within the particles, are suspended in the fluid hydrocarbon. The slurry is agitated to enable the transfer of reactants from the fluid into the particles.

The polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 2 to about 50 by mole, preferably from about 2 to about 20% by mole and in particular from about 2 to about 7% by mole. The benefit of having a high ethylene concentration is that the productivity of the catalyst is increased but the drawback is that more ethylene then needs to be recycled than if the concentration was lower.

The temperature in the slurry polymerization is typically from 50 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. The loop reactor is a closed pipe completely filled with slurry in which the slurry is circulated with a high velocity along the pipe by using a circulation pump. Loop reactors are well known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

It is preferred to conduct the slurry polymerization above the critical temperature and pressure of the fluid mixture. The fluid phase of the slurry is then in supercritical state. Such operation is described in U.S. Pat. No. 5,391,654. The temperature is then typically from 85 to 110° C., preferably from 90 to 105° C. and the pressure is from 40 to 150 bar, preferably from 50 to 100 bar. Preferably at least one of the slurry reactors is operated so that the fluid phase contained therein is in a supercritical state and especially preferably both are operated in such conditions.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. No. 3,374,211, U.S. Pat. No. 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460.

Hydrogen may be fed into the reactors to control the molecular weight of the polymer as known in the art. Furthermore, one or more alpha-olefin comonomers may be added into the reactors to control the density of the polymer product. The actual amount of such hydrogen and comonomer feeds depends on the catalyst that is used and the desired melt index (or molecular weight) and density (or comonomer content) of the resulting polymer.

The solids concentration in the second polymerization reactor is determined. Any method known in the art may be used. Typically, the density of the slurry is measured. Methods that can be used include radioactive methods and Coriolis force based methods. Such methods are well known in the art and sensors for measuring the density of the slurry are commercially available.

The solids concentration can then be calculated from the slurry density when the densities of the fluid phase and the polymer are known.

The density of the polymer can be directly measured by taking a sample of the polymer and measuring the density in the laboratory. Alternatively, the polymer density may be estimated from the process conditions or taken as the target density of the polymer.

The composition of the fluid is analyzed, for instance, by using on-line gas chromatography. When the composition of the fluid is known then the density of the fluid can be calculated. The calculation can be done by using equations of state. Alternatively, empirical correlations which have been fitted to match experimentally measured fluid densities can be used. Methods for calculating the density of the fluid are known to the person skilled in the art.

From the densities of the fluid ($\rho_f$), polymer ($\rho_p$) and slurry ($\rho_s$) the volume fraction of the fluid in the slurry ($\varepsilon$) can be calculated:

$$\varepsilon = \frac{\rho_p - \rho_s}{\rho_p - \rho_f}$$

And the solids concentration, or the weight fraction of the solids in the slurry, ($w_p$) is then $$w_p = \frac{(1-\varepsilon) \cdot \rho_p}{\rho_s}$$

Slurry Withdrawal

Polymer is withdrawn from the slurry reactors preferably continuously. By "continuous withdrawal" is meant a process where there is a substantially uninterrupted flow of slurry out from the reactor to the subsequent process stage. Such flow is typically arranged by means of automatic flow control valves whose position is continuously adjusted in response to a measured process variable, such as the pressure or the slurry level in the reactor. The person skilled in the art understands that also uninterrupted flow may have short and infrequent interruptions, for instance, due to a disturbance in the process. However, continuous withdrawal is clearly different from intermittent withdrawal where the slurry is withdrawn periodically so that for a given period there is a flow out of the reactor and for another period the flow is fully stopped. Periodical withdrawal is done, for instance, by using on-off valves which are opened fully when the pressure in the reactor exceeds a predefined maximum value and are then shut fully when the pressure reaches a preset minimum value. Such intermittent removal may include settling of the polymer in the withdrawal device to concentrate the withdrawn slurry. Such devices are called settling legs.

The slurry stream withdrawn from the first polymerization reactor, the first slurry stream, is directed to the second polymerization reactor.

Two slurry streams are withdrawn from the second polymerization reactor. The second slurry stream has higher solids concentration than the slurry in average in the second reactor. The third slurry stream has lower solids concentration than the slurry in average in the second reactor.

The second and third slurry streams may be withdrawn directly from the second polymerization reactor. In such a case the second slurry stream can be withdrawn, for instance, from the outer periphery of a bend of the loop reactor. The third slurry stream can correspondingly be withdrawn from the inner periphery of such bend.

It is also possible to withdraw a single slurry stream from the second polymerization reactor and divide this stream using a suitable concentration device. Such concentration devices are, for instance, a hydrocyclone, as disclosed in EP-A-1415999, or a screen, as disclosed in EP-A-1591460. The concentrated slurry stream obtained from such concentration device is then the second slurry stream and the lean stream is the third slurry stream.

According to one preferred embodiment of the present invention the second slurry stream is returned during the start-up period into the first polymerization reactor and the third slurry stream is directed, for instance, to the recovery section. It is then preferred to remove the solids from the third slurry stream before directing it to the recovery section. This may prevent unwanted reactions and fouling of the recovery section.

After the desired solids concentration has been reached in the first and second reactors the second slurry stream is directed to the subsequent polymerization stages and the third slurry stream is either returned into either one of the first and the second polymerization reactor or stopped.

According to another preferred embodiment of the invention the second and third slurry streams are withdrawn from the second polymerization reactor by adjusting their ratio so that the solids concentration in the second polymerization reactor is maintained at a desired level. A part of the second slurry stream is then returned into one of the first and the second polymerization reactors, preferably the first polymerization reactor. This then allows maintaining the desired solids concentrations in both polymerization reactors.

In order to facilitate the transfer of the slurry from the second reactor to the first reactor, the transfer line for the second slurry stream may be equipped with a pump. Alternatively, a sufficient pressure difference may also be achieved by withdrawing the second and third slurry streams immediately downstream of the circulation pump of the second loop reactor and returned immediately upstream of the circulation pump of the first loop reactor.

Further Polymerization Stages

The subsequent polymerization reactors, if present, may be further slurry polymerization reactors or they may also be gas phase polymerization reactors. Examples of such gas phase polymerization reactors are a fluidized bed polymerization reactor, a fast fluidized bed reactor, a settled bed reactor and combinations of these. Subsequent polymerization reactors may be any reactors known to the person skilled in the art.

The first and second polymerization reactors may also be preceded by additional polymerization and treatment stages, such as prepolymerization stages. In prepolymerization a small amount of monomer, preferably olefin monomer is polymerized on the catalyst to improve its behaviour in the process or to achieve desired product properties. Prepolymerization is well known to the person skilled in the art and may be conducted in any suitable method known in the art. Prepolymerization is disclosed, for instance, in WO-A-96/18662, EP-A-517183 and GB-A-1532332.

Advantages of the Invention

The present invention allows the process to be started up quickly. Thereby the product reaches quickly the specification values and a minimum amount of off-spec material is produced. Furthermore, the process of the present invention can also be used to return the process quickly to target conditions after a disturbance has occurred in the process.

EXAMPLES

Example 1 (Comparative)

A loop reactor having a volume of 50 dm$^3$ was operated at a temperature of 70° C. and a pressure of 63 bar. Into the reactor were introduced 2 kg/h ethylene catalyst, 20 kg/h propane diluent and 1 g/h hydrogen. Also 1.5 g/h of a solid polymerisation catalyst component, which is sold by BASF under a trade name of Lynx 200™, was introduced into the reactor together with triethylaluminium cocatalyst so that the molar ratio of aluminium to titanium was 50.

The slurry from the reactor was withdrawn intermittently and directed into a loop reactor having a volume of 150 dm$^3$ and which was operated at 95° C. temperature and 61 bar pressure. Into the reactor was further added propane, ethylene and hydrogen so that the ethylene content in the reaction mixture was 3.5 mol-% and the molar ratio of hydrogen to ethylene was 500 mol/kmol. The production rate of ethylene homopolymer having a melt index MFR2 of 300 g/10 min was 10 kg/h.

The slurry was intermittently withdrawn from the loop reactor and directed to a second loop reactor having a volume of 350 dm$^3$ operated at a temperature of 95° C. and a pressure of about 60 bar. The polymerization was conducted in similar ethylene concentration and hydrogen to ethylene ratio as the first loop reactor. The polymer production rate was 20 kg/h and the melt index of the polymer was 300 g/10 min.

The second loop reactor contained two outlets. The first outlet was located at the outer periphery of the lower bend of the reactor and thus withdraws slurry which is more concentrated than the slurry in average in the reactor. The second outlet was located at the inner periphery of the lower bend and thus withdraws slurry which is more dilute than the slurry in average in the reactor.

When the process was started up by starting the catalyst feed all the slurry was withdrawn through the first outlet. It took about 5 hours until both reactors had reached the target solids concentration.

Example 2

Procedure of Example 1 was repeated except that slurry was withdrawn through both outlets of the second reactor. The slurry withdrawn through the first outlet was returned into the first loop reactor and the slurry withdrawn through the second outlet was withdrawn as the product stream. After the start of the catalyst feed it took about 40 to 50 minutes until both reactors had reached the target solids concentration.

The invention claimed is:

1. A process for producing ethylene polymers in at least two cascaded polymerization reactors comprising the steps of:
    polymerizing ethylene in the presence of a polymerization catalyst, hydrogen and optionally one or more alpha-olefin comonomers in a diluent in a first polymerization reactor to produce a first slurry comprising a first ethylene polymer and fluid phase comprising said diluent;
    withdrawing a first stream of said slurry from said first polymerization reactor;
    directing said slurry stream into a second polymerization reactor;
    polymerizing ethylene in the presence of the first ethylene polymer, the polymerization catalyst, hydrogen and optionally one or more alpha-olefin comonomers in a diluent in a second polymerization reactor to produce a second slurry comprising an ethylene polymer mixture and a fluid phase comprising said diluent;
    withdrawing from said second polymerization reactor a second slurry stream having a solids concentration which is higher than the average solids concentration of the second slurry within the second polymerization reactor;
    withdrawing from said second polymerization reactor a third slurry stream having a solids concentration which is lower than the average solids concentration of the second slurry within the second polymerization reactor; and
    directing at least a part of said second slurry stream into one of said first and second polymerization reactor.

2. The process according to claim 1 wherein from 50 to 100% by weight of said second slurry stream is directed to one of the first and second polymerization reactor.

3. The process according to claim 2 wherein the whole second slurry stream is returned into one of the first and second polymerization reactor.

4. The process according to claim 1 wherein said third slurry stream is directed to at least one separation step to separate the solids from the fluid phase.

5. The process according to claim 1 wherein said third slurry stream is directed to a subsequent polymerization step.

6. The process according to claim 1 wherein at least one of the first and second polymerization reactors is operated in such conditions that the fluid phase of the slurry is in super-critical state.

7. The process according to claim 1 wherein at least one of said first, second and third slurry streams is withdrawn continuously.

8. The process according to claim 7 wherein all of said first, second and third slurry streams are withdrawn continuously.

9. The process according to claim 1 wherein the second slurry stream is directed to the first polymerization reactor.

10. The process according to claim 1 wherein the first and second polymerization reactors are loop reactors.

11. A process for producing ethylene polymers in at least two cascaded polymerization reactors comprising the steps of:
- polymerizing ethylene in the presence of a polymerization catalyst, hydrogen and optionally one or more alpha-olefin comonomers in a diluent in a first polymerization reactor to produce a first slurry comprising a first ethylene polymer and fluid phase comprising said diluent;
- withdrawing a first stream of said slurry from said first polymerization reactor;
- directing said slurry stream into a second polymerization reactor;
- polymerizing ethylene in the presence of the first ethylene polymer, the polymerization catalyst, hydrogen and optionally one or more alpha-olefin comonomers in a diluent in a second polymerization reactor to produce a second slurry comprising an ethylene polymer mixture and a fluid phase comprising said diluent;
- withdrawing from said second polymerization reactor a second slurry stream having a solids concentration which is higher than the average solids concentration of the second slurry within the second polymerization reactor;
- withdrawing from said second polymerization reactor a third slurry stream having a solids concentration which is lower than the average solids concentration of the second slurry within the second polymerization reactor;
- providing a minimum limit value for solids concentration within the first polymerization reactor;
- determining the solids concentration within the first polymerization reactor; and
- directing the second slurry stream into a separation step or a further polymerization stage if said solids concentration within the first polymerization reactor is greater than said minimum limit value for solids concentration within the first polymerization reactor and directing the second slurry stream into the first polymerization reactor if said solids concentration within the first polymerization reactor is lower than said minimum limit value for solids concentration within the first polymerization reactor.

12. The process according to claim 11 comprising the step of returning the third slurry stream into the first polymerization reactor if said solids concentration within the first polymerization reactor is greater than said minimum limit value for solids concentration within the first polymerization reactor and directing the third slurry stream into the separation step or subsequent polymerization step if said solids concentration within the first polymerization reactor is lower than said minimum limit value for solids concentration within the first polymerization reactor.

13. The process according to claim 11 comprising the step of stopping the withdrawal of the third slurry stream from the second polymerization reactor if said solids concentration within the first polymerization reactor is greater than said minimum limit value for solids concentration within the first polymerization reactor and directing the third slurry stream into the separation step or subsequent polymerization step if said solids concentration within the first polymerization reactor is lower than said minimum limit value for solids concentration within the first polymerization reactor.

14. The process of starting up a polymerization reaction in at least two cascaded polymerization reactors comprising the steps of claim 11.

* * * * *